United States Patent [19]

Durst

[11] Patent Number: 5,174,428
[45] Date of Patent: Dec. 29, 1992

[54] CONFECTION CONVEYOR SYSTEM WITH CONSTANT-VELOCITY PICK-UP SECTION AND PAUSING DROP SECTION

[75] Inventor: Richard E. Durst, Austin, Tex.

[73] Assignee: APV Crepaco Inc., Austin, Tex.

[21] Appl. No.: 682,426

[22] Filed: Apr. 8, 1991

[51] Int. Cl.[5] .............................. B65G 47/38
[52] U.S. Cl. .............................. 198/343.1; 198/418.6
[58] Field of Search .................... 198/343.1, 418.6, 606

[56] References Cited

U.S. PATENT DOCUMENTS

| | | | |
|---|---|---|---|
| Re. 29,477 | 11/1977 | Wight . | |
| 1,973,196 | 9/1934 | Baker | 198/343.1 X |
| 2,551,080 | 5/1951 | Allen et al. . | |
| 2,671,552 | 3/1954 | Miller | 198/343.1 |
| 2,716,478 | 8/1955 | Wehmiller et al. | 198/343.1 |
| 2,725,970 | 12/1955 | Wullschleger | 198/343.1 |
| 2,932,376 | 4/1960 | Millington . | |
| 3,506,105 | 4/1970 | Stauber . | |
| 3,850,566 | 11/1974 | Moore | 198/343.1 X |
| 3,859,019 | 1/1975 | Wight . | |
| 3,880,301 | 4/1975 | Reilly | 198/418.6 X |
| 4,142,626 | 3/1979 | Bradley . | |
| 4,231,470 | 11/1980 | Parkes . | |
| 4,265,355 | 5/1981 | Davis . | |
| 4,369,612 | 1/1983 | Wight . | |
| 4,489,536 | 12/1984 | Degn et al. . | |
| 4,574,694 | 3/1986 | Dubuit . | |

FOREIGN PATENT DOCUMENTS

| | | |
|---|---|---|
| 974806 | 4/1961 | United Kingdom . |
| 992394 | 6/1961 | United Kingdom . |
| 1328278 | 11/1970 | United Kingdom . |
| 1378499 | 12/1971 | United Kingdom . |

OTHER PUBLICATIONS

"The Shape of Your Ice Cream Future. The Glacier 600," Glacier Industries, Inc., Austin, Tex. (no date given).

Primary Examiner—D. Glenn Dayoan
Attorney, Agent, or Firm—Lahive & Cockfield

[57] ABSTRACT

Method and apparatus for processing of ice cream confections, having constant-velocity confection pick-up function which is uninterrupted by pausing confection-drop function. A confection conveyor system having two cooperating conveyor sections has a constant-velocity confection-receiving station on the first conveyor section and a pausing confection-drop station on the second conveyor section. A serial stream of confections is obtained from a constant-velocity serial stream of confections on the first conveyor section at an intermediate transfer station between the two conveyor sections. At the confection-drop station located in the second conveyor section one confection is dropped on each lane of several parallel lanes on an off-line confection wrapper. The confections are dropped substantially without horizontal motion as received by the wrapper.

16 Claims, 13 Drawing Sheets

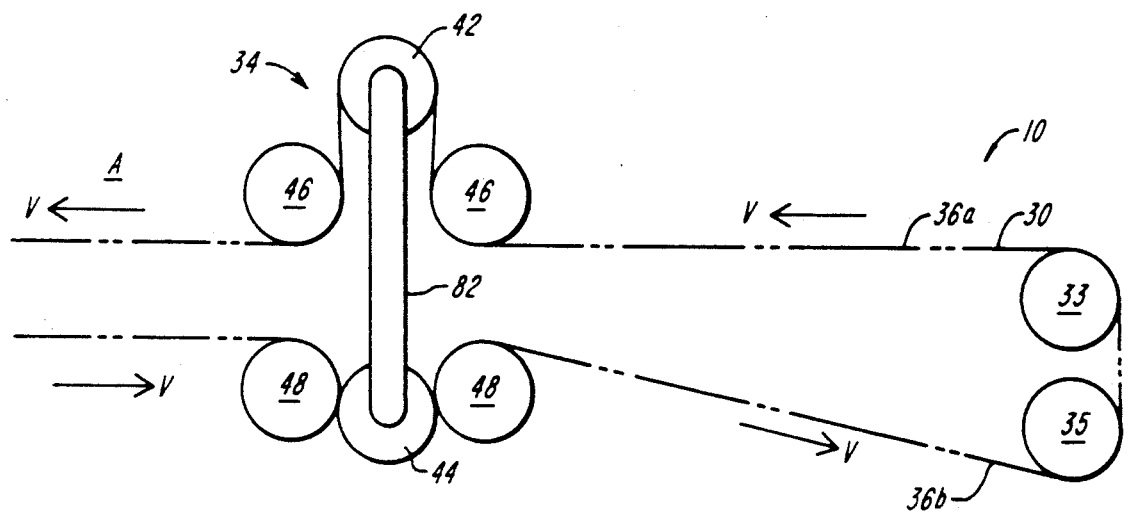
FIG. 2A
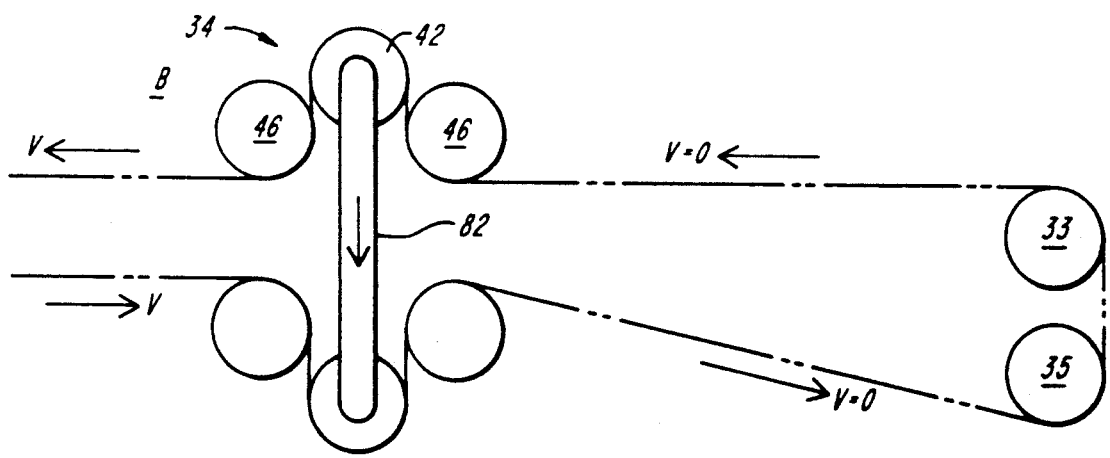
FIG. 2B
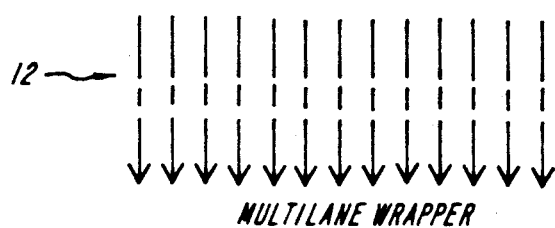
MULTILANE WRAPPER

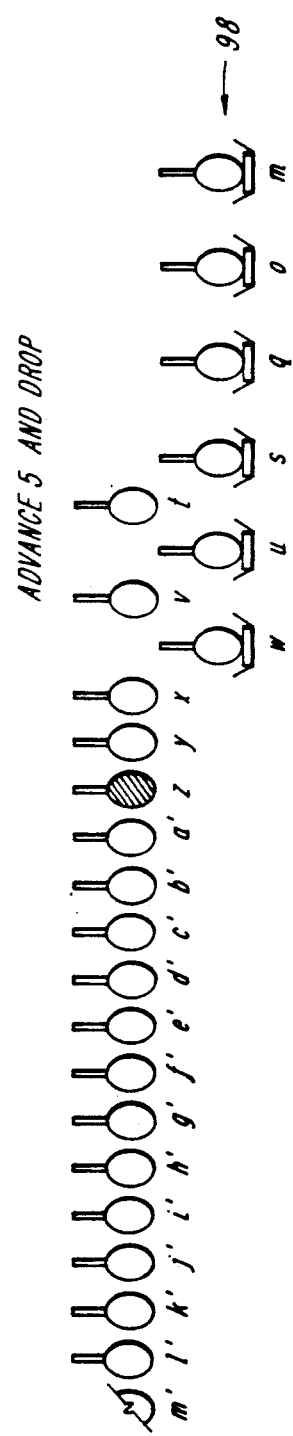

CONFECTION CONVEYOR SYSTEM WITH CONSTANT-VELOCITY PICK-UP SECTION AND PAUSING DROP SECTION

FIELD OF THE INVENTION

This invention relates in general to devices for making confections and more particularly to a continuous process for manufacturing frozen confections.

BACKGROUND OF THE INVENTION

It is customary in manufacturing frozen confections such as ice cream confections or the like to employ an extrusion process in which ice cream in a plastic or semi-soft state is forced through an extrusion nozzle with the external shape or configuration of the confection being controlled by the shape of the nozzle orifice. Thus, if the confection is to have a particular shape, a particular nozzle having the desired orifice shape is used. The extruded ice cream is cut, for example with a hot wire cutter, and the extrudate is then allowed to fall on a continuously moving conveyor. In many instances the confection is provided with a stick inserted into the extruded ice cream forms on the conveyor by a stick inserter mechanism.

Once the extruded confection is cut, then the confection must be fixed in solid frozen form so as to keep its imparted shape. For this reason, it is necessary to convey the extruded confection to a freezer or refrigeration unit without delay, and normally by depositing the extruded confection on a continuously moving conveyor which continuously conveys the extruded confection along a relatively long path in the freezer unit. For reasons of economy, this long path may be made serpentine-like, so as to achieve the maximum dwell time of confection in the freezer over a reduced area.

It is of particular interest to coordinate delivery of frozen confection from the moving conveyor to a packaging area. Typically the packaging area includes a wrapping machine, and the confection should be transferred to the wrapper without changing the overall speed of the conveyor. Prior art systems accomplish this by employing a transfer conveyor and a paddle mechanism to transfer the confection from the moving conveyor onto the wrapper.

It is therefore an object of the present invention to provide a method and apparatus for the efficient and continuous conveyance of confections from a confection-forming end to a confection-packaging end of a production line.

It is another object of the present invention to provide a method and apparatus for converting a serial stream of processed confections on a continuous conveyor to a plurality of parallel streams of confections off the conveyor, without changing the overall speed of the conveyor.

It is yet another object of the present invention to provide a method and apparatus for transferring confection from a serial stream of confection on a continuous conveyor to a plurality of parallel streams in an off-line downstream work area wherein the confection is transferred substantially without horizontal motion upon impact at the downstream work area.

SUMMARY OF THE INVENTION

The present invention provides a method of and apparatus for transferring confection from a serial stream of individual confections on a constant-velocity production-line conveyor system to a plurality of parallel streams on an off-line downstream work area, without interrupting the upstream end of the production line and without imparting substantial horizontal motion to the confection when it is transferred to the downstream work area. The conversion from a serial stream to parallel streams allows for throughput at conveyor speeds, even with work area devices, such as wrappers, which operate at slower speeds. The conveyor system has an upstream confection-receiving section moving at a constant velocity and a downstream confection-drop section which stops at a regular rate and transfers (or drops) confections to the downstream work area. The off-line downstream work area is adjacent to the downstream confection drop section. The downstream work area may include further processing equipment, such as a product wrapper.

A goal of the invention is to deliver the confections from the conveyor system to the downstream work area without stopping the entire conveyor system, and where the confection is delivered to the downstream work area substantially without a motion component that would cause the dropped confection to travel away from the target of the drop without interruption of the constant velocity of the remainder of the conveyor system. For example, with substantially no horizontal motion component, the confections are not likely to skid or otherwise migrate away from their assigned locations. Meanwhile, the constant velocity of the remainder of the conveyor system allows predictable processing dwell time as well as ensuring continued synchronization of the extruder/cutter with the conveyor movement. In a preferred embodiment, the upstream confection-processing area of the production line includes a frozen-confection forming unit, such as an ice cream extruder and a freezer unit, and the downstream work area processing equipment includes a multilane frozen confection wrapper.

In the manufacture of extruded products, such as ice cream confections, it is desirable that all of the confection formed at the upstream confection-forming area be uniform in consistency. This requires moving of the extruded bars into and through the freezer unit at a constant rate. This constancy is difficult to maintain if the upstream conveyor must start and stop to accommodate transfer of confection to a downstream processing equipment, such as to a confection wrapper. A benefit of the continuous confection conveyor system of the present invention, such as in the manufacture of frozen confections, is that the freezer conveyor, which carries the extruded confection into and through the freezer, can be continuous, thereby allowing the extruder/cutter to also operate continuously.

In a preferred embodiment of the invention, the conveyor system is formed of two conveyor sections, including an intermediate confection transfer station for transferring confections, after freezing (or other processing) from one conveyor section to the other. In this embodiment, the separate conveyor sections move at the same continuous rate, so as to ease the transfer of frozen confection from the former to the latter conveyor at the intermediate confection transfer station.

In another embodiment of the invention, the second confection-receiving conveyor includes two overhead and parallel lines which adjoin the freezer conveyor at an intermediate confection transfer station. The frozen confection is conveyed in double parallel serial streams on the freezer conveyor at the intermediate transfer station, wherein a first of these streams is transferred to a first of the two parallel lines of the second conveyor, into a serial stream of individual confections held in that line. A second of the freezer conveyor streams is transferred at the intermediate confection transfer station to a second of the two parallel second conveyor lines for forming a serial stream of individual confections thereon.

In a preferred embodiment, each of the continuous, confection-receiving parallel lines is of the suspended-chain type, and carries a serial stream of confection grippers. In some applications, the grippers each pickup a respective one of the confections from the serial stream of frozen confections from the upstream freezer conveyor to a dip tank for dipping the confections to form a coating thereon (such as a chocolate coating) and then carries the confections to the downstream confection drop section of the conveyor. The conveyor pauses and releases the dipped confection at the drop section for substantially vertical delivery thereof to a wrapper unit.

A method of establishing a start-up condition for transferring confection products from a serial stream on a conveyor to a drop station, with a pausing portion of the conveyor located at the drop station, is also set forth herein. This method applies to situations where the pitch between products in the conveyor stream is less than the pitch between lanes at the drop station. The operating conveyor at the drop station undergoes a pause for providing parallel transfer of a number, n, of confections on the conveyor to a stationary receiving station without relative movement between the pausing portion of the conveyor at the drop station and the receiving station. The method includes the steps of (a) transferring n confections from the paused conveyor portion onto the receiving station, the transferred confections being selected from every other one of a segment of the serial stream, (b) removing any of the serial stream located on the conveyor downstream of the drop station, (c) advancing the conveyor a distance equal to n+1 products of the serial stream, stopping the conveyor and transferring n products, (d) removing the remainder of the stream located on the conveyor downstream of the drop station, (e) advancing the conveyor a distance equal to n−1 products, stopping and transferring n products, and (f) thereafter alternately repeating steps (c) and (e), for a continuing steady state transfer of the n products.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 2(A,B) is a schematic representation of a translating apparatus of the invention shown as block 34 in FIG. 1;

DETAILED DESCRIPTION OF PREFERRED EMBODIMENTS

Figure 1:
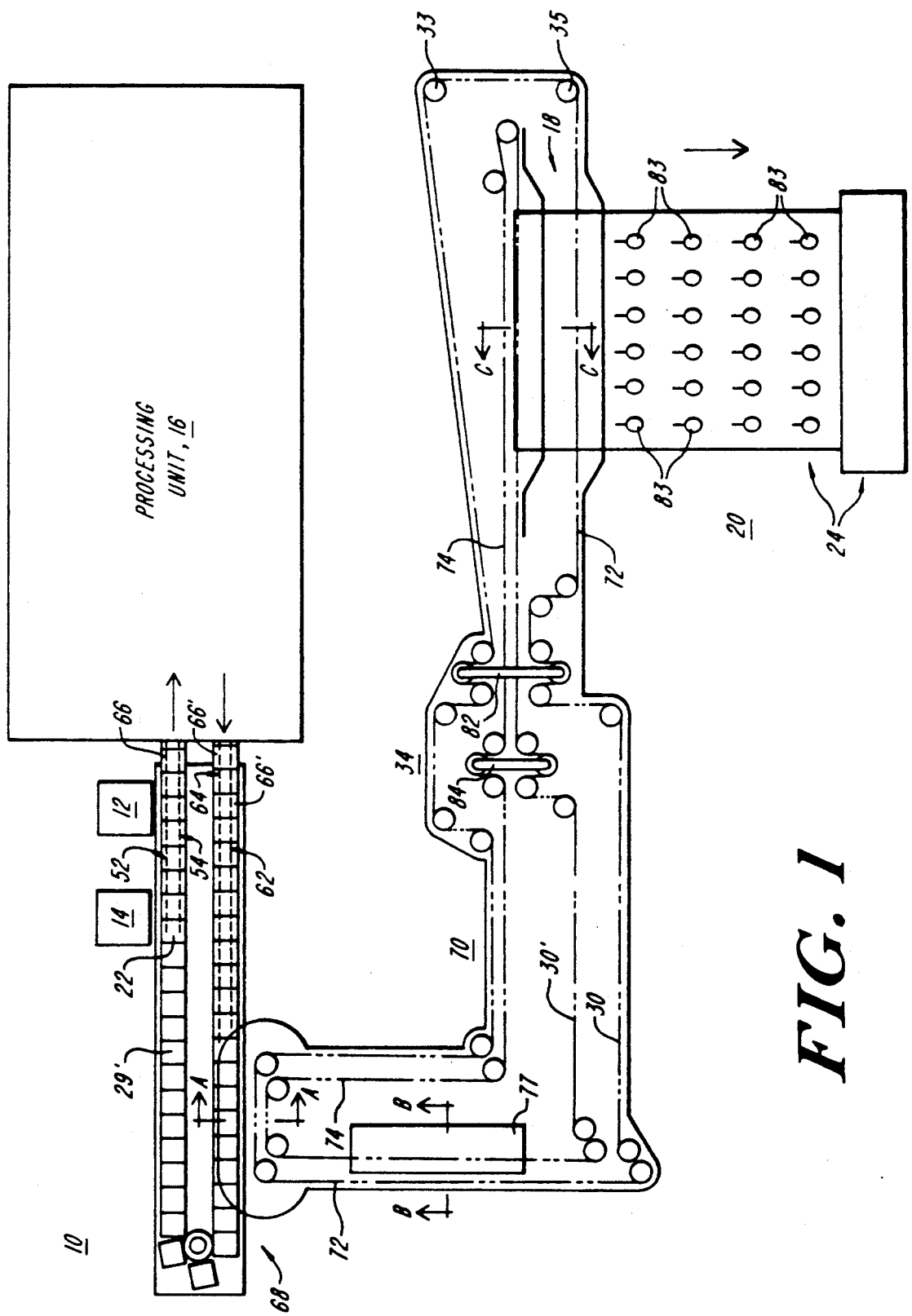
FIG. 1 is a plan view of an embodiment of the invention.

An illustrative embodiment of the invention is shown in FIG. 1 wherein a continuous velocity confection-receiving conveyor 10 receives a series of individual formed confections 66 from a production unit 14 (such as an extruder), and a stick inserter 12 and conveys the confections serially through a processor 16 (such as a freezer compartment), and then the processed (e.g., frozen) confection 66' is further conveyed in a serial stream to a downstream confection transfer station 68 of the freezer conveyor 10, where they are transferred to a second conveyor 70. The frozen confections 66' are then transferred at drop station 18 to an off-line service unit 20 (such as a confection wrapper) for further processing. One suitable stick inserter mechanism is described in U.S. Pat. No. 3,859,019, which is incorporated hereby by reference. One known food product freezing apparatus is taught in U.S. Pat. No. Re. 29,477, which is incorporated herein by reference.

The freezer conveyor section 10 conventionally includes a plurality of transports 29 (e.g., plates) formed in an endless loop, such as are driven by a chain (not shown) about pullies, with the chain in turn being driven by a constant-velocity drive source such as an electric motor.

The serial stream of formed confections 66 is loaded onto an upstream confection-receiving section 22 of conveyor 10 while the freezer conveyor section is continuously moving at a constant velocity V. After passing through processing unit 16, the now processed (i.e., frozen) series of confections 66' are conveyed (still on the conveyor and still moving at the constant velocity V) to the transfer station 68, where they are transferred to the secondary conveyor section 70. Each of frozen confections 66' is subsequently transferred without horizontal motion in the direction of movement of conveyor 70 onto the service unit 20 for further processing, after being released from the conveyor 70. As discussed in detail below this is achieved by causing only a portion of conveyor 70 at drop station 18 to stop, while the remainder of both conveyors continues at velocity V.

Figure 9:
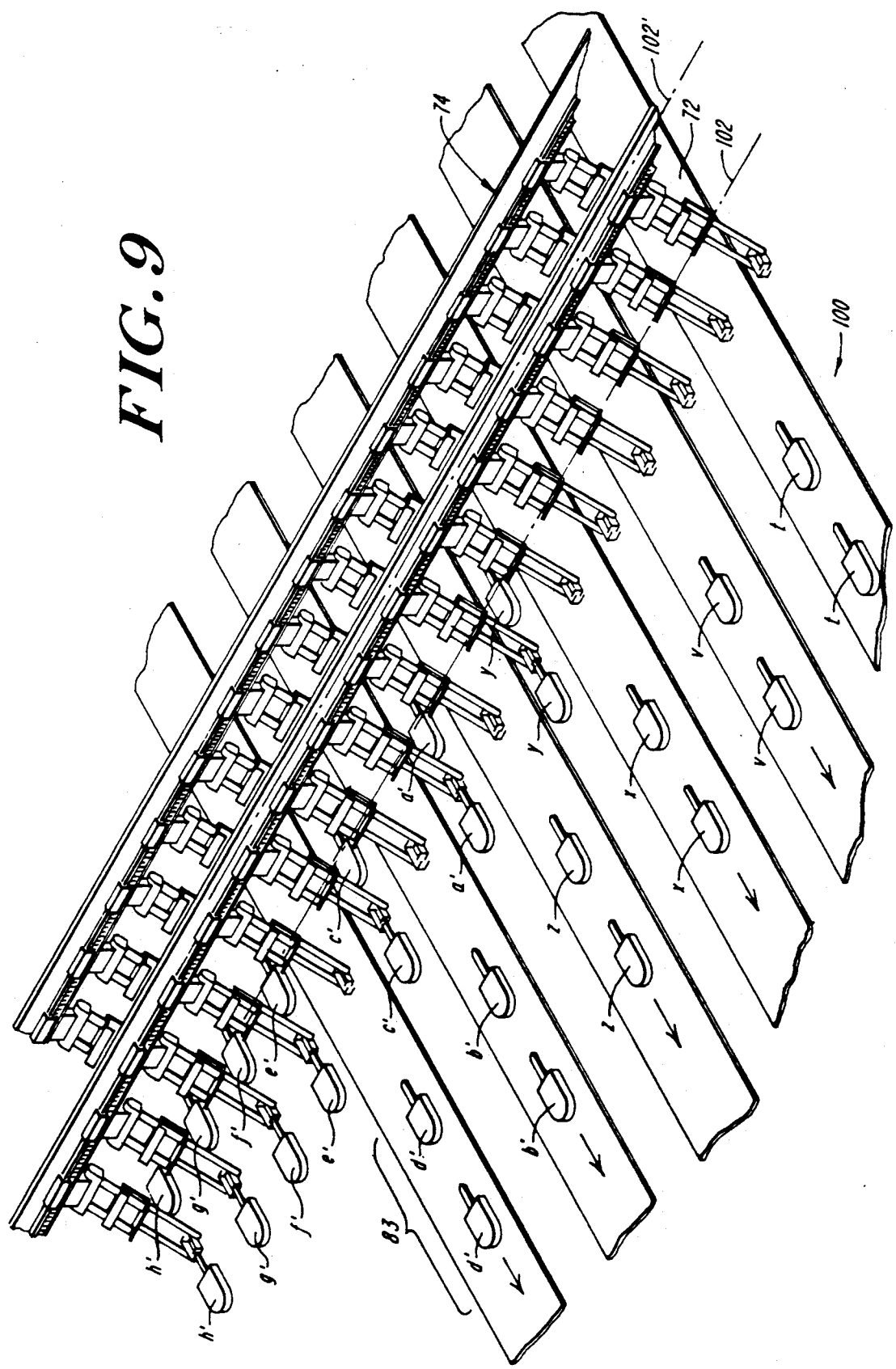
FIG. 9 is a perspective view of the confection drop station and the adjacent conveyors.

In the embodiment of FIG. 1, the service unit 20 includes a multilane wrapper 24 and may also include a cooperating boxing unit (not shown). As illustrated in FIG. 9, each of the confections 66' is placed onto a respective segment of a continuous sheet of wrapping paper 27 (either paused or continuously moving) at the infeed of wrapper 24. The wrapping paper moves into wrapper 24 at a predetermined rate, carrying the confections in their respective lanes to wrapper 24 which wraps the respective confections from each lane.

In one embodiment of the invention, the rate of confection transfer from the conveyor system to wrapper 24 is determined according to the maximum achievable throughput of the wrapper 24 which can be obtained without paper wastage. The confection wrapping function of wrapper 24 generally has a lower maximum velocity than the maximum velocity of the confection conveying conveyor 10, and ideally, the confections are transferred from conveyor 70 at a rate that achieves maximum velocity of the wrapper. The velocity V of both the freezer conveyor 10 and the constant-velocity portion of the secondary conveyor 70 is selected according to this transfer rate, being a rate which allows transfer without causing bunching (i.e., transferring the confections to service unit 20 too closely spaced so as to interfere with complete wrapping of the confections).

Thus, the present invention includes an arrangement for converting a serial line of individual frozen confections 66' from conveyors 10 and 70 into a plurality of parallel lanes of transferred individual confections 66' on the multilane wrapper 24, even though the extruded formed confections 66 on the conveyor are continuously conveyed at constant velocity V into the freezer 16 and the frozen confections 66' are continuously conveyed at constant velocity V through transfer station 68 and toward the conveyor confection drop station 18, and even though a portion of the conveyor 70 pauses at the drop station before transferring the confection. Hence, in the practice of the invention, operation of lost-motion apparatus 34 provides for conversion of the frozen confection 66' from the relatively higher speed continuously moving serial flow to the plurality of parallel lanes of confections on the relatively slower speed multilane wrapper, without interruption of the conveyors continuous motion at confection-receiving section 22, or in freezer 16, thereby assuring smooth operation of the confection forming and freezing functions of the production line.

In the specific embodiment of the invention shown in FIG. 1, each of the side-by-side plates 29' carry two rows 52, 54 of formed confections 66 into freezer 16 and then two rows 62, 64 of frozen confections 66' are conveyed out of the freezer to the intermediate confection transfer station 68. This embodiment also includes two parallel, continuous, serially-conveying, overhead chain conveyor lines 72, 74, each including chain 30 and 30' respectively. Conveyor lines 72, 74 run adjacent to conveyor 10 at the intermediate confection transfer station 68, with frozen confections 66 from row 64 being transferred to line 72 and frozen confections 66 from row 62 being transferred to line 74, again without slowing down conveyor 10, or lines 72, 74 at this station.

Figure 5:
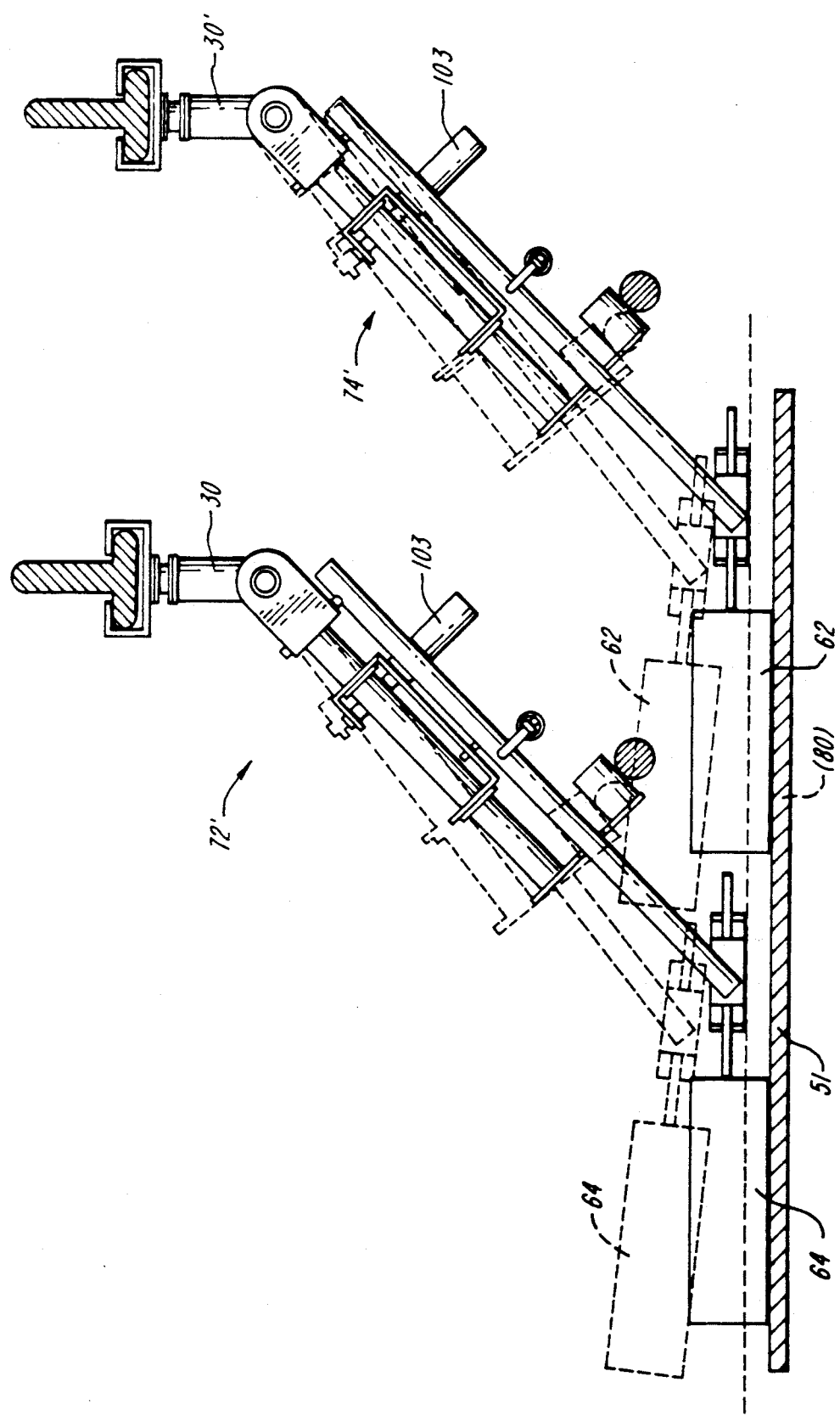
FIG. 5 is a sectional view through line A—A of FIG. 1 showing the confection gripping mechanism of this embodiment.

Each of lines 72, 74 comprises a closed-loop serial stream of confection grippers 72', 74', pivotally suspended from conveyor chains 30 and 30' respectively, as shown in FIG. 5. Hence, the transfer of confections from rows 62, 64 to lines 74 and 72 is effected by a respective gripper 74', 72' gripping respective ones of confections 66' and transferring them accordingly from rows 64, 62 to lines 72, 74. The grippers are raised and lowered, as indicated in phantom in FIGS. 5 and 6, by means of a conventional cam and rail arrangement (not shown) so as to pick-up and release confections and to clear obstructions, accordingly. The cooperation of conveyor 10 and the overhung conveyor lines 72, 74 at station 68 is shown in FIG. 7.

In order to assist in such transfer of confections 66' from rows 62, 64 to lines 74, 72, a mechanical vibrating device (not shown) may be employed to impart vibratory energy to plates 29' of conveyor 10 so as to free confections 66' from the specific plates 29' upon which they rest.

Figure 6:
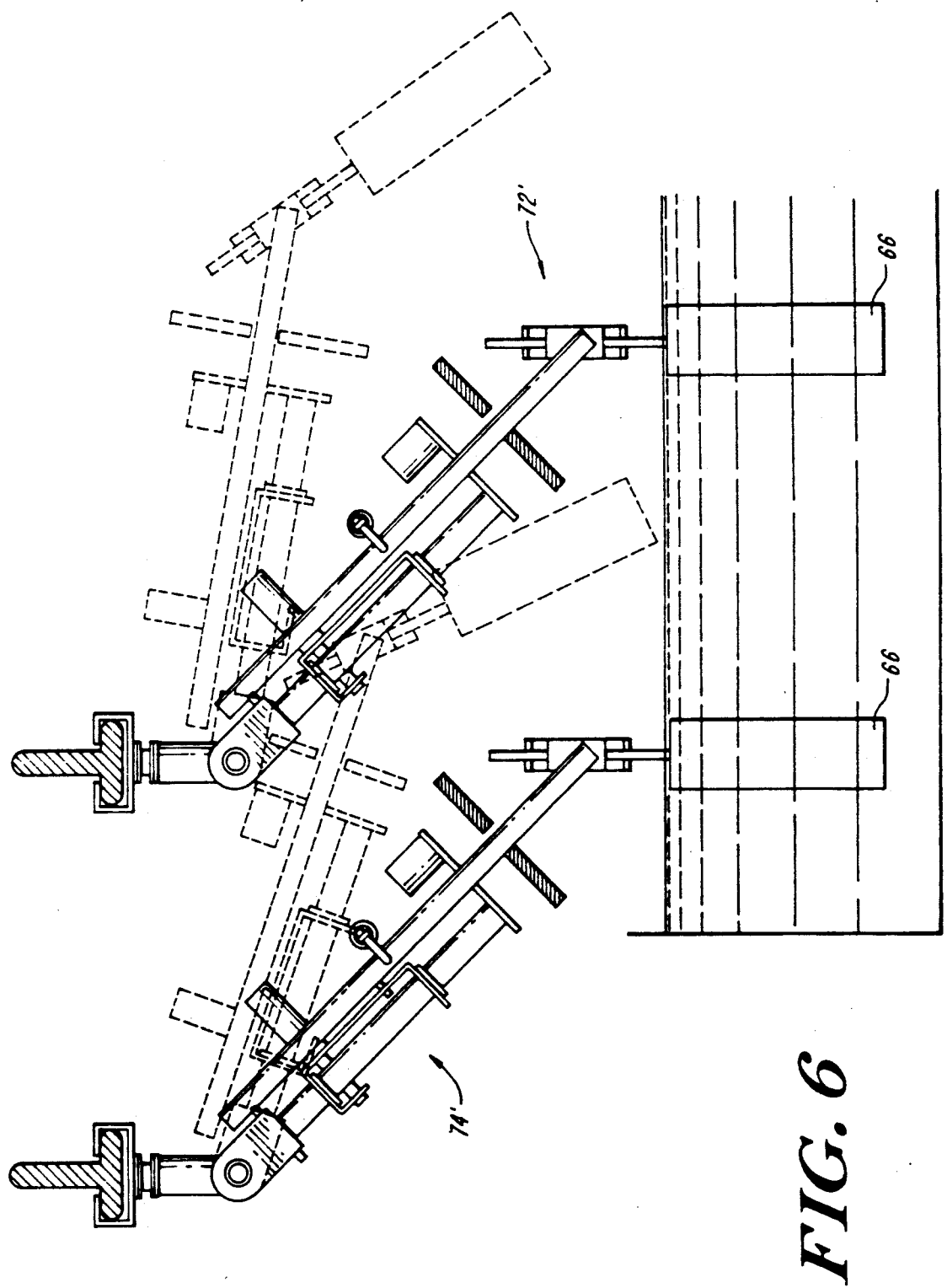
FIG. 6 is a sectional view through line B—B of FIG. 5 showing the confection dipping station of this embodiment.
Figure 7:
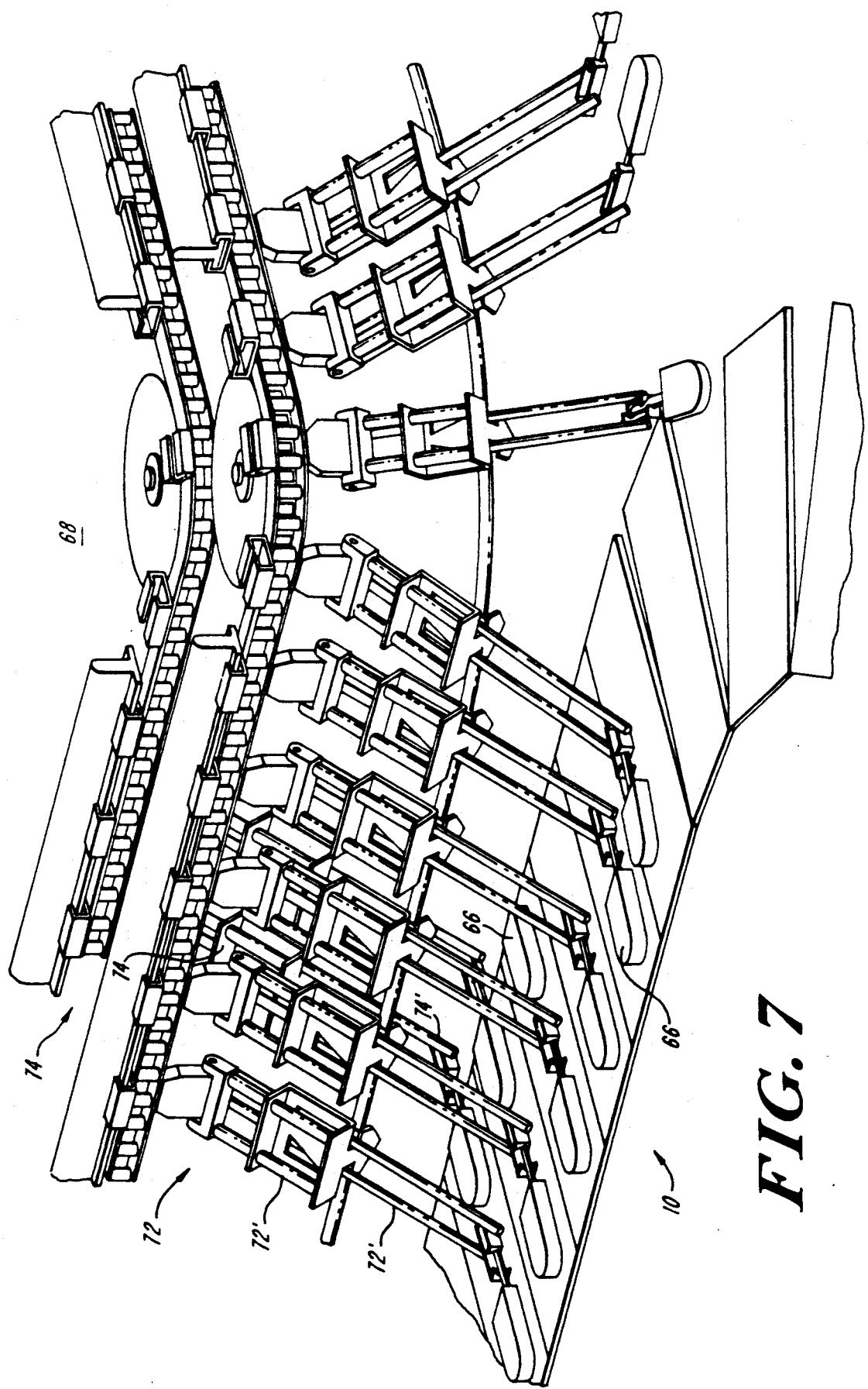
FIG. 7 is a perspective view of the intermediate confection transfer station of this embodiment.

In this configuration, the confections 66' on lines 74, 72, held by respective grippers 74', 72', may be dipped in a coating (such as chocolate) dip tank 77, as shown in FIG. 6; the tank is shown located between intermediate confection transfer station 68 and confection drop station 18, below lines 72, 74 as shown in FIG. 1.

The frozen confections 66' on lines 72, 74, respectively, are carried to confection drop station 18 for delivery to a downstream processor unit 20, such as to a confection wrapper 24. For example, each of lines 72, 74 can simultaneously feed the same lanes of a multilane wrapper to form parallel pairs 83 of spaced apart confections in respective serial streams thereon. This delivery is accomplished by action of a lost-motion moving-frame apparatus 34. The wrapper advances the wrapping paper and wraps the received products accordingly.

It is made evident from FIG. 1 that lines 72, 74 are closer together at station 68 (see section line A—A, FIG. 1) than at station 18 (see section line C—C, FIG. 1). This is so because the frozen confections 66' are formed in closely spaced rows, while the confection pairs must be dropped with sufficient spacing for all dropped confections to permit complete wrapping of each confection. Therefore it will be further appreciated that the sectional view through line C—C is similar to that of line A—A shown in FIG. 5, and is therefore not separately drawn.

Turning now to FIG. 2, the mechanism of the invention which enables pausing at the drop station without interruption of the upstream part of the conveyor will now be set forth in detail. As shown in FIG. 1, there are separate lost motion mechanisms 82 and 84 for the separate conveyor lines. However, for clarity the detail and operation with respect to only one line will be shown. As indicated in FIG. 2a,b, the conveyor and its associated chain 30 nominally moves at constant velocity V. However, lost-motion apparatus 34 enables temporary stoppage (i.e., pausing at zero velocity) of portions 36a, 36b of the conveyor and its associated chain 30, even while the balance of the conveyor and its associated chain 30 continues to move at constant velocity V. Providing this temporary stoppage at confection drop station 18, i.e., with the conveyor and associated chain portions 36a, 36b paused at zero velocity, without interrupting the flow of the balance of the conveyor and associated chain, assures constant-velocity confection flow in confection-receiving section 22, freezer 16, and in station 68, while permitting transferring at one time of a plurality of frozen confections 66' out of the serial stream on the conveyor at confection drop station 18 onto a plurality of parallel lanes at the infeed of the multilane wrapper 24. This is advantageously achieved without imparting substantial horizontal motion in the direction of movement of the conveyor 70 to the transferred confections at the drop station 18 during the transfer, so that the transferred confections do not skid or otherwise become bunched or disordered on the wrapper.

Lost-motion apparatus 34 includes a reciprocating translating frame 82 and a pair of main sprockets 42, 44 affixed at opposite ends of frame 82. The lost-motion apparatus 34 is shown in two final positions A and B, respectively, in FIGS. 2A and 2B, and preferably moves at velocity V/2 when moving between these two final positions. Of particular note is the feature that sprocket 42 moves out of and sprocket 44 moves into chain 30 when the lost-motion apparatus moves from position A to position B (and vice versa when returning back to position A). This movement from position A to B momentarily reduces the conveyor and associated chain portion 36b velocity at the confection drop station 18 to zero, i.e., the conveyor and associated chain portion 36b pause, at which time the confection transfer is made.

More specifically, it will be appreciated that the velocity V of chain portion 36a is reduced by sprocket 42 moving at V/2 from its at-rest position A toward idlers 46 (i.e., reducing the velocity V of chain portion 36a by V/2 to V/2). Chain section 30 is carried from idler 48 around idlers 33 and 35 (FIG. 1), and back to idlers 46. Furthermore, since chain section 36a pulls chain section 36b, chain section 36b now is moving at V/2. However, the chain section 36b is also being pulled at −V/2 by sprocket 44 moving away from idlers 48. Therefore, the velocity V of chain portion 36b is reduced to zero by movement of the sprocket 44 into the chain while the first sprocket 42 moves away from the chain, creating slack in the chain. Accordingly, the chain section 36b pauses at zero velocity. Later, with the transfer of a plurality of frozen confections onto parallel lanes of the wrapper infeed having been completed, the translating assembly 40 moves back to position A, at least at velocity V/2, to reset the system, and the process begins again.

The cycling of frame 82 can be coordinated with the advancing and wrapping steps of the confection wrapper so as to assure coordinated transfer and wrapping. The programming device, for example, a micro computer (not shown) which controls the cycling of frame 82 can also provide an activating signal for actuating release of the confections for transferring them onto the wrapper.

Figure 3:
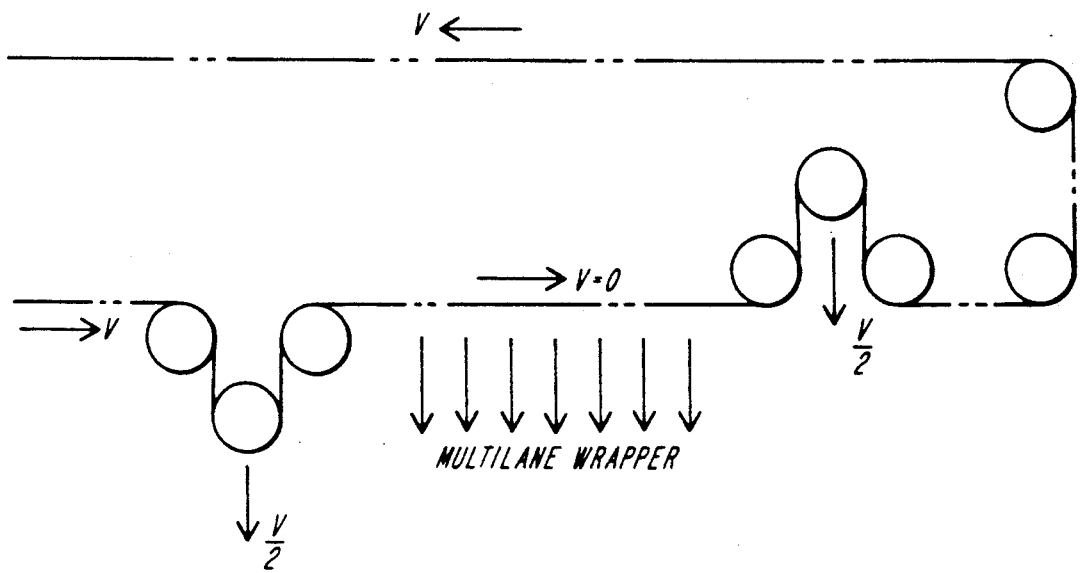
FIGS. 3 and 4 are alternative embodiments of the invention of FIG. 1.
Figure 4:
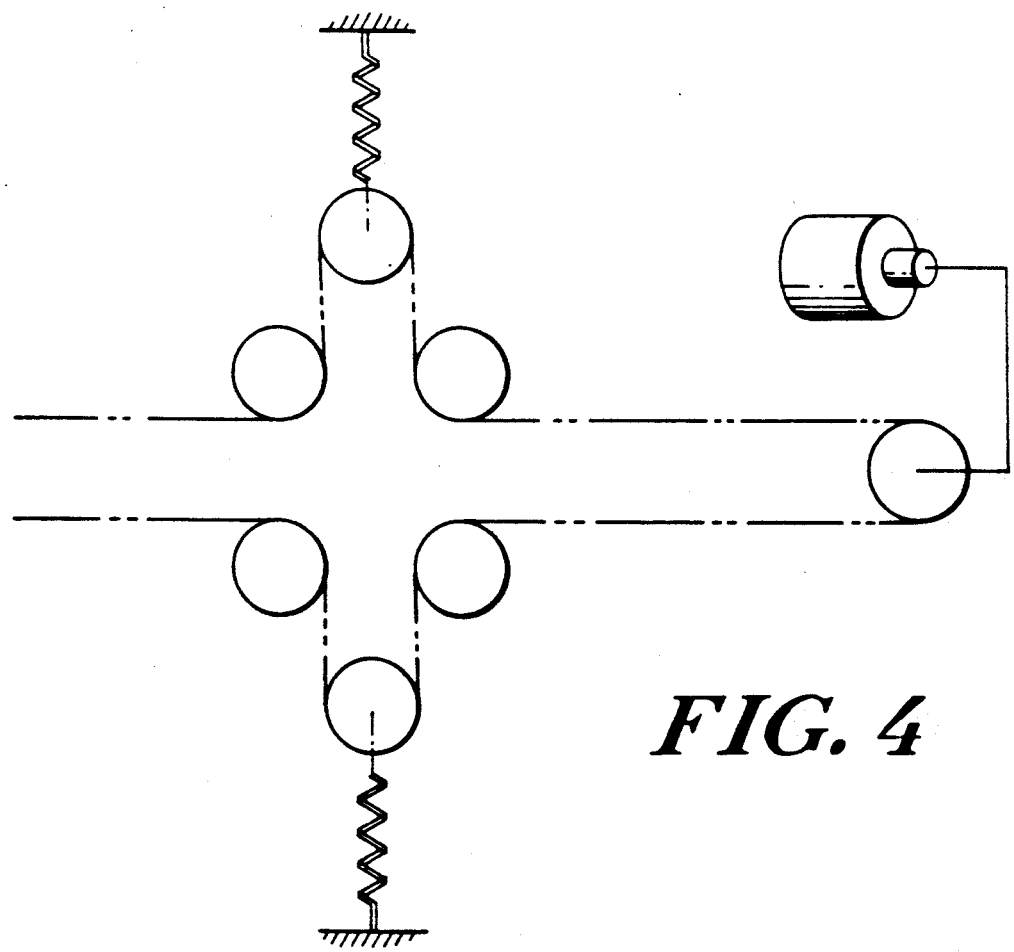

An alternative sprocket arrangement is shown in FIG. 3 where the movement of the two sprockets is synchronized having a common drive or other synchronizing means. In the embodiment of FIG. 4, the motion of the sprocket is controlled by a servo motor, and the spring-loading sprockets absorb the effect of the continuously moving part of the chain.

The confection drop of the present invention is operable with various downstream processing equipment, such as the discussed multilane wrapper. One problem which may arise in coordinating such transfer is that separation of confections on the conveyor line or parallel lines may not be sufficient to enable a straight transfer of the series of confections onto the wrapper lanes. This then requires some mechanism for spreading out the dropped confections so as to lie appropriately on the wrapper.

The present invention solves this problem by only dropping every other one of the serial stream of confections arriving in the drop area. One method incorporating this arrangement is illustrated in FIG. 8, and includes a start-up process which minimizes lost confection during system operation. This method applies to various embodiments of the invention and for ease of description only is now described with regard to one of the conveyor lines 72 of the embodiment of FIG. 1.

Figure 8A:
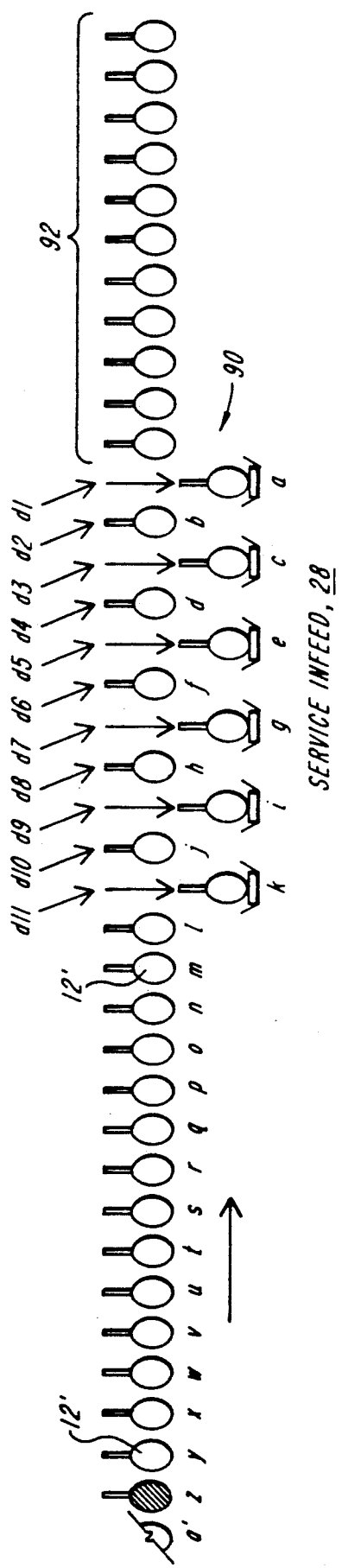
FIG. 8(a-d) is a schematic representation of a method of the invention.
Figure 8B:
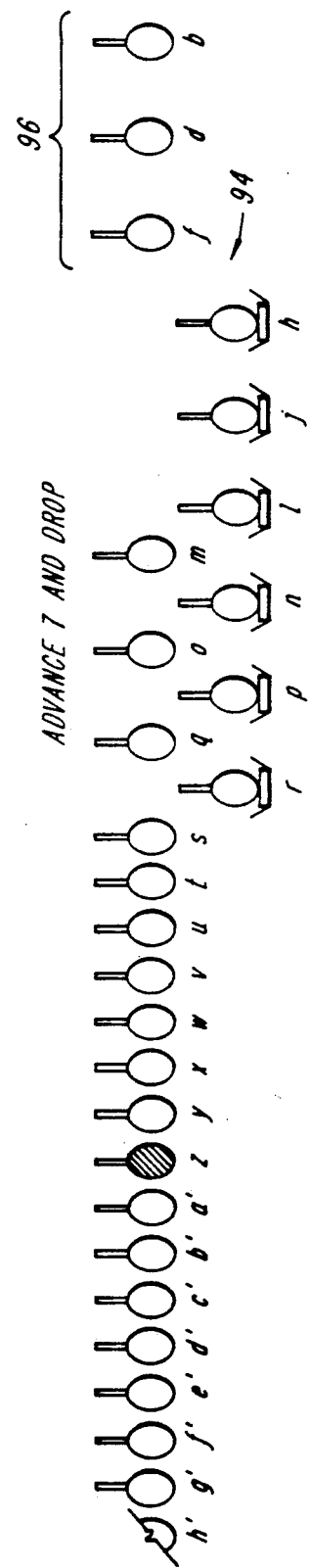
Figure 8D:
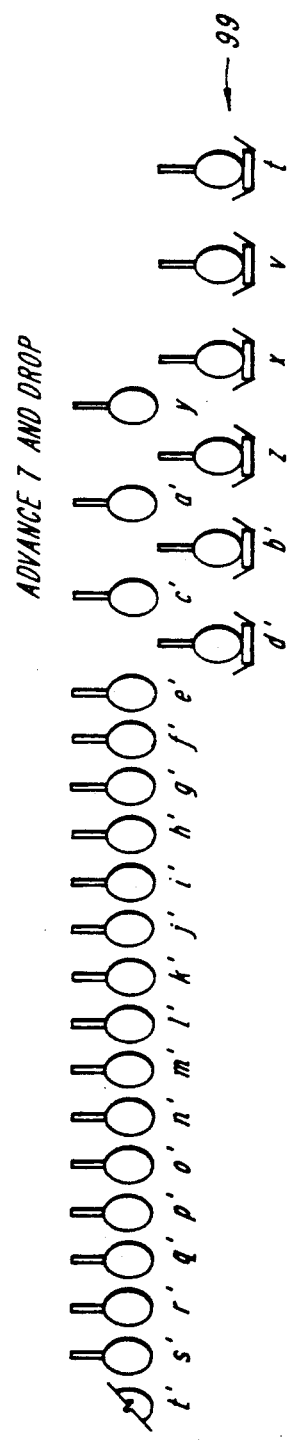

Conveyor line 72 is loaded with a serial stream of frozen confections 66', which are shown in FIG. 8A at and in the general vicinity of drop station 18. The drop station 18 itself sees eleven grippers (at fixed locations d1–d11) every drop cycle, with every other gripper (at locations d1, d3, d5, d7, d9, and d11) being caused to drop its confection. In particular, an arm 102 (shown in FIGS. 9 and 10) is activated, when it arrives in the position B shown in FIG. 2b, to engage release pins 103 (shown in FIGS. 5 and 10) on each of the six grippers at locations d1, d3, d5, d7, d9, and d11, for causing release of six confections, one from each of grippers d1, d3, d5, d7, d9, and d11, after the grippers come to rest at the drop station. By such action, the six confections (a, c, e, g, i, and k) are transferred onto a respective one of the six lanes of the infeed of wrapper 24. (FIG. 9 shows these transferred confections 90 already transferred onto the wrapper infeed.) Any "lost" confections 92 which are located at the time of the first drop downstream of drop station 18 are removed from the conveyor by other means.

In the second drop cycle (FIG. 8B), the serial stream of frozen confections on conveyor line 72 is advanced by seven confections from its position in FIG. 8A and then a second group 94 of six confections (h, j, l, n, p, and r) is transferred onto the wrapper infeed, and again the lost downstream confections 96 are recovered. The setup phase is now completed.

Thereafter, the production cycle proceeds in a steady state by addancing alternately five (FIG. 8C) and seven (FIG. 8D) confections, each time transferring six confections 98, 99 onto the wrapper infeed for the entire remaining production run, without any further lost product. Implementation of this continuously alternating number (e.g., 5 and then 7) of advancing confections is easily coordinated with the operation of the lost-motion apparatus 34 since both are controlled by a suitable microcomputer.

Figure 11:
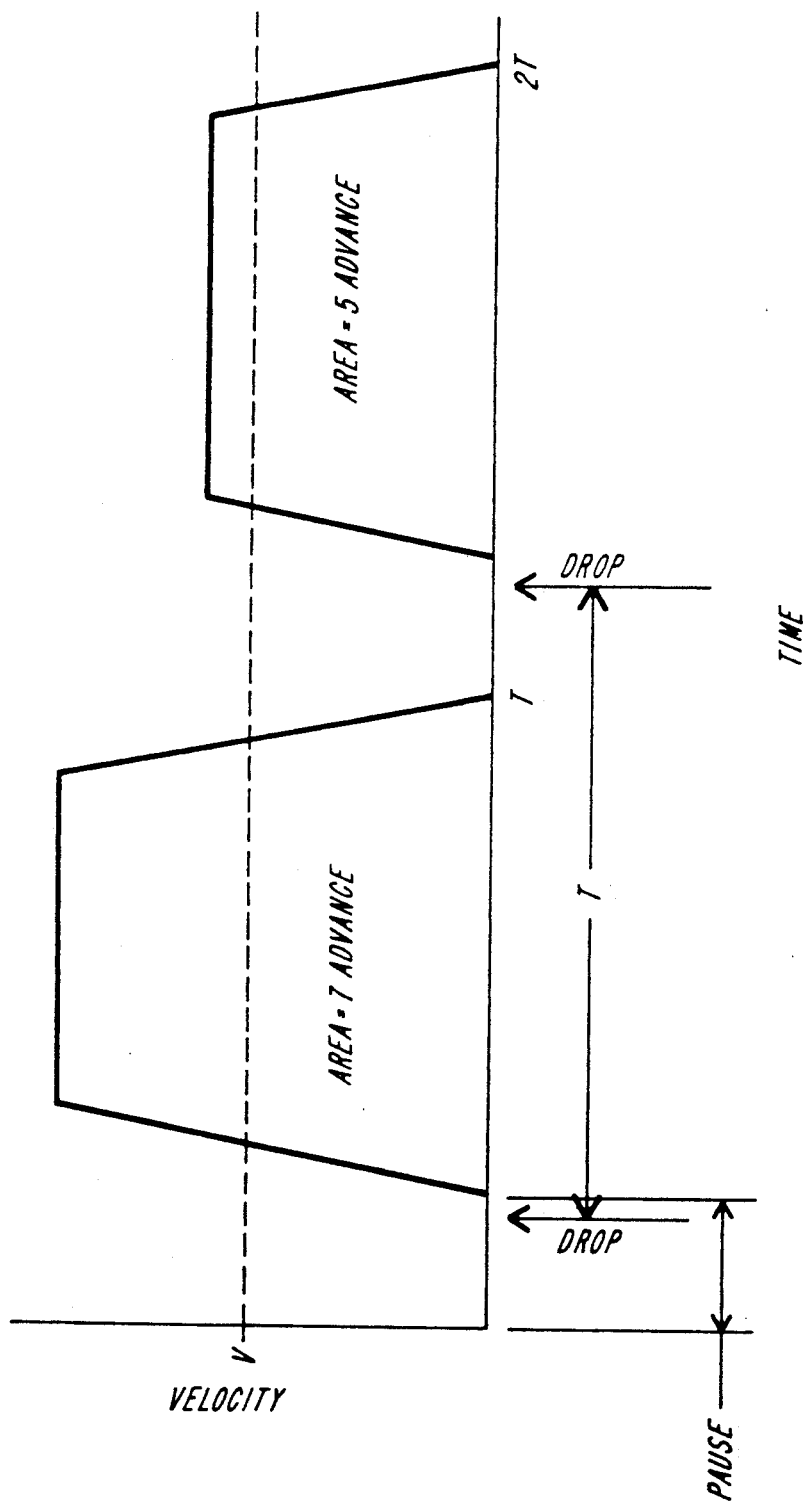
FIG. 11 is a graphical illustration of a time/velocity profile for the conveyor at the drop station.

FIG. 11 illustrates graphically the time/velocity profile of the chain advance to provide for the alternate advance of five and seven confection positions, while maintaining the drop time constant.

It will be understood that in any system in which the pitch of the conveyor grippers equals the pitch of the lanes, the conveyor would advance the requisite number, n, of confections and deposit them in the requisite number, n, of lanes.

Of course, in the system shown, there are parallel lines of confections at the drop station in which six grippers in its front line and six grippers in the back line are simultaneously actuated to transfer two confections to each lane for a total of twelve confections transferred at each pause.

Figure 10:
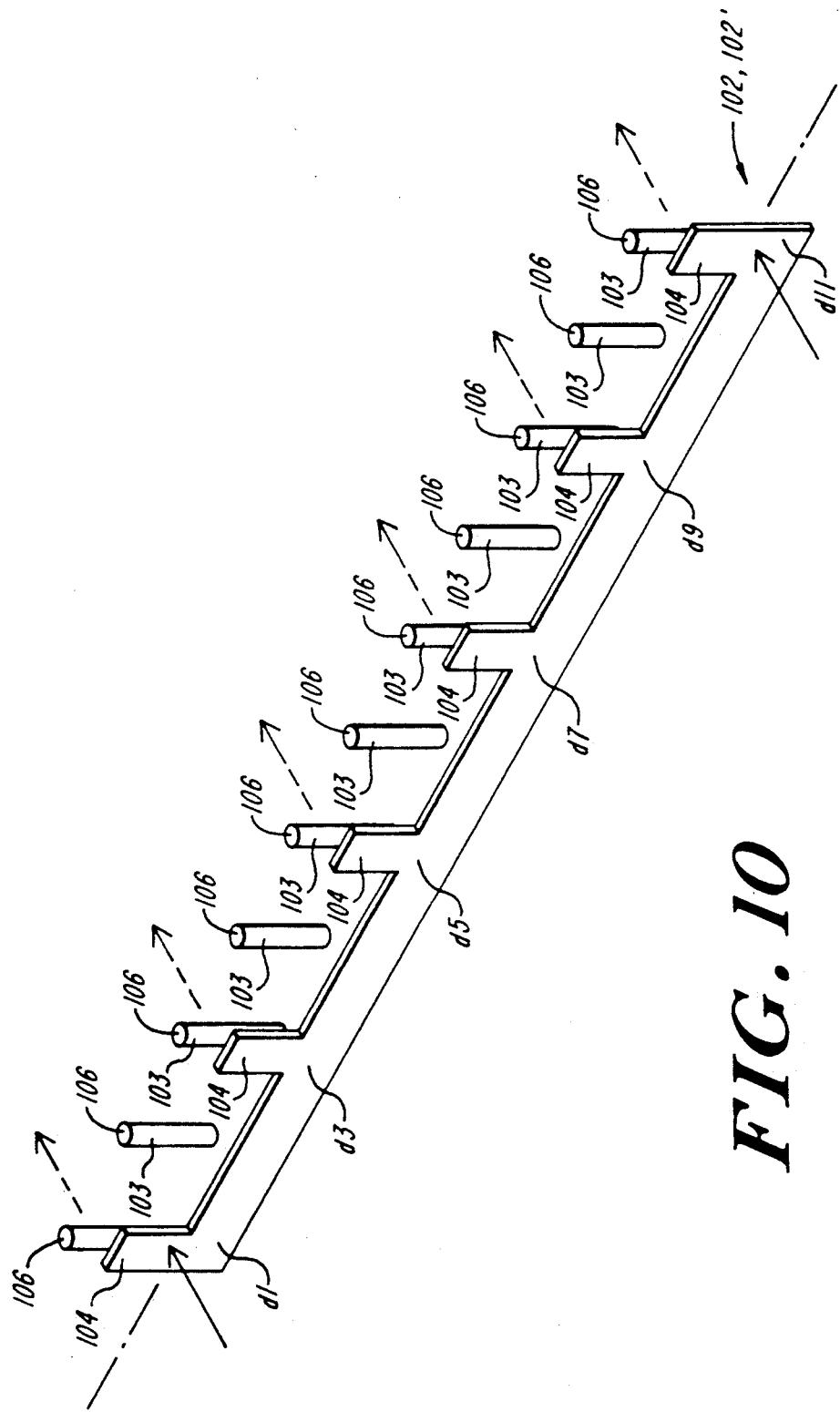
FIG. 10 is a perspective view of a release mechanism at the confection drop station.

The simultaneous dropping of pairs 83 of confections on wrapper paper sheets 100 is shown in FIG. 9. The simultaneous release mechanism 102, 102', for each line 72, 74, is shown in FIG. 10 having flanges 104 which act in cooperation with the release tabs 106 of the grippers which are paused at locations d1, d3, d5, d7, d9 and d11.

It will be appreciated that the foregoing method is suited to setup of an assembly employing other than a six lane wrapper, and adaptation of the disclosed method to other than six lane confection drop is within the spirit and scope of the present invention. For example, the two parallel lines 72, 74 of FIG. 1, each of which are paired to feed a six lane wrapper, can each feed a respective six lanes of a twelve-lane wrapper. Furthermore, still other and further embodiments and variations of the invention are contemplated. Therefore, the above disclosure will be understood as provided by way of illustration and not by way of limitation, and that the invention as set forth herein is limited only as set forth in the appended claims.

I claim:

1. Apparatus for manufacture of processed confections, the apparatus comprising,
   conveyor means for conveying confections from a first station to a drop station, said conveyor means comprising an endless loop of carrying plates moving at a substantially constant velocity, V, in a first direction by said first station toward said drop station,
   deposit means adjacent to said first station for depositing a serial stream of individual confections onto said carrying plates while they are moving by said first station at said substantially constant velocity,
   processing means displaced from said deposit means in said first direction for processing said serial stream of individual confections on said conveyor means, while said confections are being conveyed at said substantially constant velocity,
   receiving means for receiving a plurality of parallel lanes of processed confections from said serial stream for parallel processing, said receiving means being located adjacent to said drop station, and
   drop means for simultaneously transferring at said drop station a plurality of said confections from said serial stream to said receiver means to form a plurality of parallel streams of processed confections, said drop means comprising means for substantially pausing only a portion of said conveying means at said drop station without substantially changing the velocity of the remaining portion of said conveyor means and for placing said plurality of parallel streams of processed confections on said receiving means essentially without motion in the direction of movement of said conveyor means,
   said conveyor means including a first conveyor loop moving at said substantially constant velocity by said first station through said processing means and back to said first station,
   a second conveyor loop moving continuously at substantially the same velocity as said first conveyor loop and having a portion thereof adjacent to a portion of said first conveyor loop, and a delivery portion thereof adjacent to said receiver means, and
   intermediate transfer means for transferring confections from said first to said second conveyor loop at said adjacent portions, and wherein said drop means is located in a position to transfer confections from said second loop to said receiving means when said delivery portion of said second loop is paused at said drop means.

2. Apparatus as in claim 1 wherein said depositing means includes a confection extruder.

3. Apparatus as in claim 1 wherein said processing means comprises a freezer unit.

4. Apparatus as in claim 1 wherein said receiving means comprises a multilane confection wrapping machine.

5. Apparatus as in claim 1 wherein said means for substantially stopping only a portion of said conveying means at said drop station comprises a reciprocating frame including respective sprockets affixed at respective opposite ends of said frame, said frame reciprocating said sprockets between a first and a second pair of operating positions in order to temporarily stop motion of said portion of said conveyor means.

6. Apparatus as in claim 5 wherein said frame preferably moves at velocity V/2 when moving said sprockets from said first to said second pair of operating positions, where V is said substantially constant velocity.

7. Apparatus as in claim 6 wherein a first of said sprockets moves out of and a second of said sprockets moves into said chain when said reciprocating means moves from a first to a second reciprocation position, whereby movement of said conveyor belt and associated chain at said drop station is momentarily reduced essentially to zero velocity.

8. Apparatus as in claim 1 wherein said second conveyor loop comprises an endless conveyor means for supporting a series of product pick-up arms including actuatable means for grasping and actuatable means for releasing products.

9. Apparatus as in claim 8 wherein said apparatus includes means, for actuating said means for gripping confections when said portion of said second conveyor loop is adjacent to said portion of said first conveyor loop, and for actuating said means to release confections when said means for releasing confections is adjacent to said receiving means.

10. The apparatus of claim 1 wherein said depositing means is disposed for depositing on said first conveyor loop a parallel pair of serial streams of confections, forming a first row comprising one serial stream of confections and a second row comprising a parallel second serial stream of confections, and wherein said second conveyor loop comprises a pair of parallel lines and wherein said intermediate transfer means transfers confections from said first row on said first conveyor loop to a first one of said parallel lines of said second conveyor loop and transfers confections from said second row on said first conveyor loop to a second one of said parallel lines of said second conveyor.

11. The apparatus of claim 10 wherein said first conveyor loop comprises an endless conveyor belt driven by an endless chain, said chain supporting a series of confection support plates, and said second conveyor loop comprises endless conveyor means for supporting parallel lines of a series of product pick up arms, such that a pair of parallel serial streams of confections is conveyed by said conveyor means.

12. Apparatus in accordance with claim 11
   wherein said parallel lines of product pickup arms each include actuatable means for grasping and means for releasing confections,
   and means for actuating said means to grasp confections when said portions of said second conveyor loop is adjacent to said portion of said first conveyor loop and means for actuating said means to release confections when said means is adjacent to said receiving means.

13. A method of transferring a series of confection products forming a serial stream on a serial conveyor intended for steady state continuous conveying from a first station to a drop station with a pausing portion of said conveyor located at said drop station undergoing a pause for providing parallel transfer of a number, n, of confection products to a stationary receiving station substantially without relative movement between said pausing portion and said receiving station, said conveyor returning from said drop station to said first station, comprising the steps of
   (a) transferring n confections from said paused portion onto said receiving station, said transferred confections being every other one of a part of said serial stream, (b) removing any confections of said stream located on said conveyor downstream of said drop station prior to return of said conveyor to said first station, (c) advancing the conveyor a distance equal to n+1 or n−1 products in said stream, stopping the portion of said conveyor located at said drop station and transferring n products to said receiving portion, (d) removing the remainder of said confections from said stream located on said conveyor downstream of said transfer station and before said first station, (e) advancing the conveyor a distance equal to n−1 or n+1 products, stopping the portion of said conveyor adjacent to said receiving station and transferring n products to said receiver station, and (f) thereafter alternately repeating steps (c) and (e).

14. Apparatus for manufacture of processed confections comprising, a first closed loop conveyor comprising a series of horizontal plates moving at substantially continuous velocity V, in a first direction, a first station adjacent to said first closed loop conveyor having means for depositing confections at a substantially continuous rate on said conveyor plates as they move by said first station, thereby forming a serial stream of said confections, a second station substantially surrounding a portion of said conveyor at a position downstream from said first station, a treatment means at said second station for continuously treating said serial stream of said confections, a second closed loop conveyor having a first portion moving continuously at said velocity V, and a second portion pausing intermittently without affecting the velocity V, of said first portion, a transfer station for transferring confections from said first conveyor loop to said second conveyor loop at the portion where said second conveyor loop is moving with velocity V, a drop station positioned adjacent to the portion of said second conveyor loop which is pausing intermittently, and receiving means at said drop station for simultaneously transferring a plurality of confections from said serial stream to said receiving means as a plurality of parallel lanes of confections, while said conveyor portion is paused, such that said confections are transferred essentially without imparting any motion to said confections in the direction of movement of said second conveyor loop.

15. Apparatus in accordance with claim 14 wherein said second conveyor loop is formed as an overhead chain conveyor having individual pickup devices for picking individual confections from said first conveyor horizontal plates and carrying them around said second conveyor loop.

16. Apparatus in accordance with claim 15 wherein said means for depositing confections at said first station deposits two confections on each of said conveyor plates, said two confections being aligned in a direction generally perpendicular to the direction of motion of said first conveyor loop, and wherein said second conveyor is formed as two closely spaced parallel strands each carrying a series of individual pickup devices for substantially simultaneously picking up from each plate said two confections deposited on that plate.

* * * * *